(12) United States Patent
Frank

(10) Patent No.: US 9,636,557 B1
(45) Date of Patent: May 2, 2017

(54) RETRACTABLE GOLF BAG WHEEL ASSEMBLY

(71) Applicant: Roy W. Frank, Center Moriches, NY (US)

(72) Inventor: Roy W. Frank, Center Moriches, NY (US)

( * ) Notice: Subject to any disclaimer, the term of this patent is extended or adjusted under 35 U.S.C. 154(b) by 0 days.

(21) Appl. No.: 15/163,917

(22) Filed: May 25, 2016

(51) Int. Cl.
*B62B 1/04* (2006.01)
*A63B 55/30* (2015.01)
*B62B 1/12* (2006.01)

(52) U.S. Cl.
CPC ............... *A63B 55/30* (2015.10); *B62B 1/12* (2013.01)

(58) Field of Classification Search
CPC ...... B62B 1/008; B62B 1/12; B62B 2202/404
USPC ................. 280/651, 652, 38, 39, 40, DIG. 6
See application file for complete search history.

(56) References Cited

U.S. PATENT DOCUMENTS

| | | | | |
|---|---|---|---|---|
| 1,462,133 A * | 7/1923 | Glock | ......................... | B62B 3/02 280/39 |
| 2,427,205 A * | 9/1947 | Ford | ......................... | A61G 5/08 280/39 |
| 2,505,440 A * | 4/1950 | Taber | ...................... | A45C 5/146 280/38 |
| 4,087,102 A * | 5/1978 | Sprague | ................. | A45C 5/146 16/113.1 |
| 4,274,644 A * | 6/1981 | Taylor | ...................... | B62B 3/02 280/39 |
| 4,314,624 A * | 2/1982 | Royet | ..................... | A45C 5/146 16/113.1 |
| 4,632,409 A * | 12/1986 | Hall | ...................... | B60N 2/2848 280/30 |
| 4,659,096 A * | 4/1987 | Leimgruber | ............... | B62B 3/02 280/39 |
| 4,845,804 A * | 7/1989 | Garrett | ..................... | B60B 33/06 16/19 |
| 4,946,180 A * | 8/1990 | Baer | ....................... | A47D 1/008 280/39 |
| 5,035,437 A * | 7/1991 | Woodward | .............. | B62B 1/045 280/40 |
| 5,318,311 A * | 6/1994 | Bofill | .................... | B60N 2/2848 280/30 |
| 5,403,022 A * | 4/1995 | Snider | ................... | B60N 2/2848 280/30 |
| 5,454,576 A * | 10/1995 | Pitkanen | ................. | A63B 55/60 280/42 |
| 5,470,095 A * | 11/1995 | Bridges | ................... | A45C 5/146 280/42 |
| 5,478,097 A * | 12/1995 | Forma | ..................... | A63B 55/60 280/30 |
| 5,879,022 A * | 3/1999 | Winton | .................. | A63B 55/00 280/47.26 |

(Continued)

*Primary Examiner* — Jeffrey J Restifo

(57) ABSTRACT

A retractable golf bag wheel assembly extends and retracts relative to a golf bag to facilitate movement of the golf bag when desired. The assembly includes a lip coupled to and extending downwardly from a bottom face of a golf bag defining a recess. Each of a pair of arms is adjustable between a storage position within the recess and an extended position wherein the arms extend outwardly from the recess. Each of a pair of wheels is coupled to an associated one of the arms. A catch extends from the lip and engages the arms in the storage position. A catch release has a first end positioned proximate a top of the golf bag and a second end operationally coupled to the catch such that manipulation of the first end of the catch release disengages the catch from the arms wherein the arms extend into the extended position.

6 Claims, 4 Drawing Sheets

(56) References Cited

U.S. PATENT DOCUMENTS

| | | | | |
|---|---|---|---|---|
| 6,050,592 A * | 4/2000 | Kim | A63B 55/60 | 280/35 |
| 6,056,301 A * | 5/2000 | Berliner | A63B 55/60 | 280/43.1 |
| 6,186,522 B1 * | 2/2001 | Weis | A45C 5/146 | 280/37 |
| 6,217,043 B1 * | 4/2001 | Chumley | B62B 1/125 | 280/40 |
| 6,283,496 B1 * | 9/2001 | Dickmann | B62B 1/208 | 280/40 |
| D459,890 S | 7/2002 | Lacy et al. | | |
| 6,598,889 B1 * | 7/2003 | Su | B62B 5/0083 | 248/96 |
| 6,802,515 B2 * | 10/2004 | Sorenson | B62B 1/12 | 280/47.23 |
| 6,969,078 B2 | 11/2005 | Liao | | |
| 6,979,019 B2 * | 12/2005 | Chen | A63B 55/00 | 280/35 |
| 6,988,738 B2 * | 1/2006 | Lu | B62B 1/12 | 280/47.131 |
| 7,080,732 B2 * | 7/2006 | Bonfanti | B62B 1/042 | 206/315.3 |
| 7,287,765 B2 * | 10/2007 | Murphy | A63B 55/00 | 206/315.3 |
| 7,303,197 B1 * | 12/2007 | Searle | B62B 1/12 | 280/47.23 |
| 7,347,443 B2 * | 3/2008 | Barton | B62B 1/045 | 206/315.7 |
| 7,931,141 B2 * | 4/2011 | Kim | B62B 1/042 | 206/315.7 |
| 7,934,729 B2 * | 5/2011 | Murphy | A63B 55/00 | 280/47.17 |
| 8,544,871 B1 * | 10/2013 | Liao | B62B 3/02 | 280/62 |
| 8,764,030 B1 * | 7/2014 | Murphy | A63B 55/00 | 280/47.17 |
| 2004/0046343 A1 * | 3/2004 | Sorenson | B62B 1/12 | 280/47.23 |
| 2004/0090047 A1 * | 5/2004 | Kang | A63B 55/00 | 280/652 |
| 2004/0130111 A1 * | 7/2004 | Tsu | B62B 5/0083 | 280/47.26 |
| 2006/0001243 A1 * | 1/2006 | Hsu | B62B 1/262 | 280/652 |
| 2006/0011499 A1 * | 1/2006 | Yen | A45C 5/146 | 206/315.3 |
| 2006/0244243 A1 * | 11/2006 | Barton | B62B 1/045 | 280/652 |
| 2007/0252353 A1 * | 11/2007 | Sokol | A63B 55/60 | 280/47.26 |
| 2014/0028004 A1 * | 1/2014 | McCarthy | A63B 55/00 | 280/651 |
| 2016/0176427 A1 * | 6/2016 | Liao | B62B 3/025 | 280/642 |

\* cited by examiner

RETRACTABLE GOLF BAG WHEEL ASSEMBLY

BACKGROUND OF THE DISCLOSURE

Field of the Disclosure

The disclosure relates to wheel devices and more particularly pertains to a new wheel device for extending and retracting relative to a golf bag to provide support and facilitate movement of the golf bag when desired.

SUMMARY OF THE DISCLOSURE

An embodiment of the disclosure meets the needs presented above by generally comprising a lip coupled to and extending downwardly from a bottom face of a golf bag defining a recess. Each of a pair of arms is adjustable between a storage position within the recess and an extended position wherein the arms extend outwardly from the recess. Each of a pair of wheels is coupled to an associated one of the arms. A catch extends from the lip and engages the arms in the storage position. A catch release has a first end positioned proximate a top of the golf bag and a second end operationally coupled to the catch such that manipulation of the first end of the catch release disengages the catch from the arms wherein the arms extend into the extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
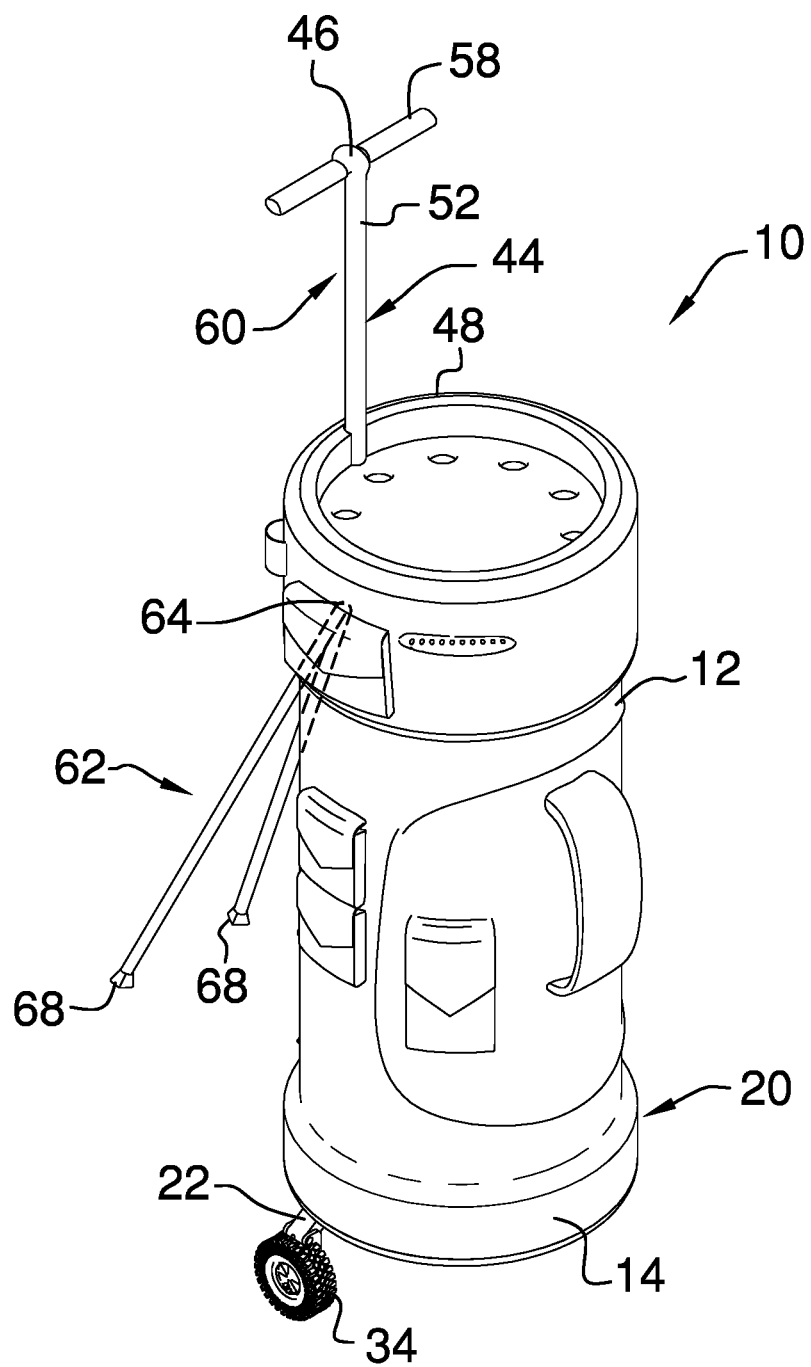
FIG. 1 is a top front side perspective view of a retractable golf bag wheel assembly according to an embodiment of the disclosure.
Figure 2:
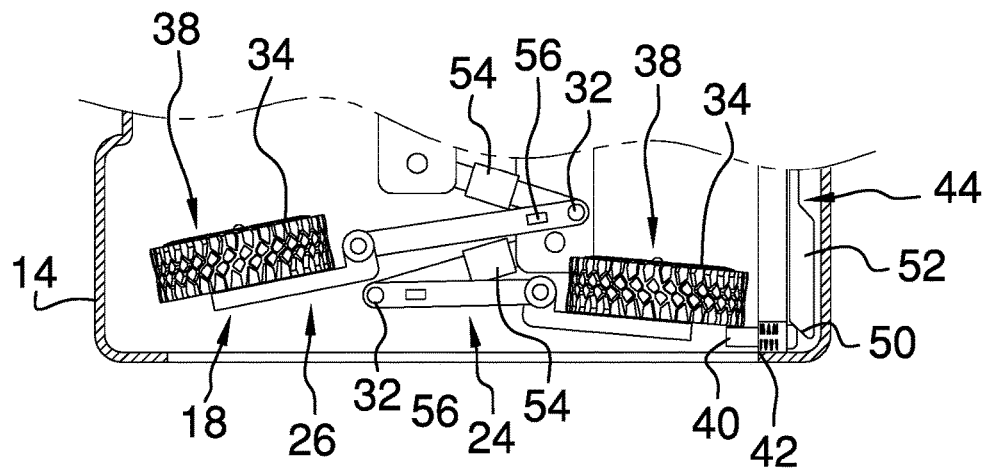
FIG. 2 is a partial cut away detailed front view of an embodiment of the disclosure with arms in a storage position.
Figure 3:
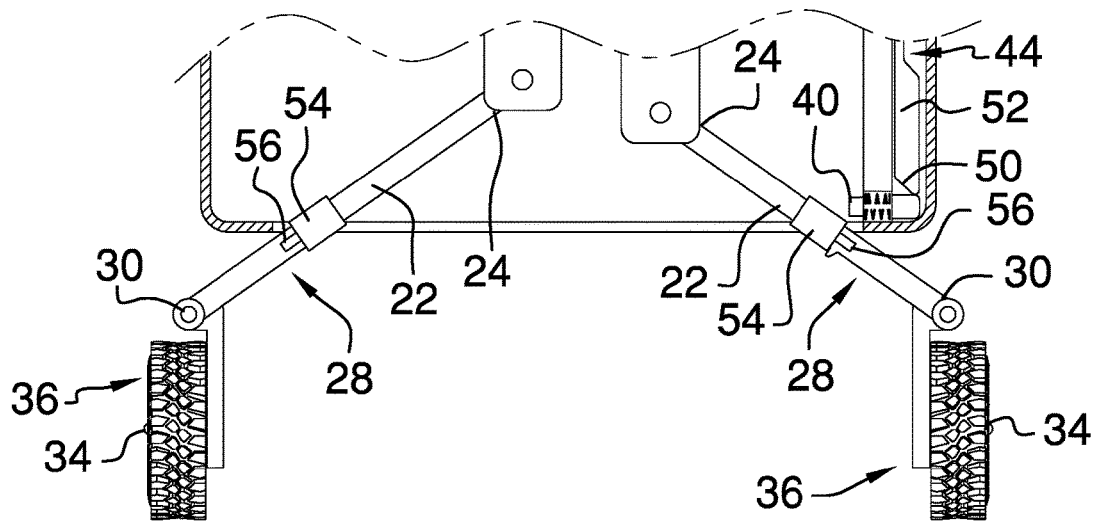
FIG. 3 is a partial cut away detailed front view of an embodiment of the disclosure with arms in an extended position.
Figure 4:
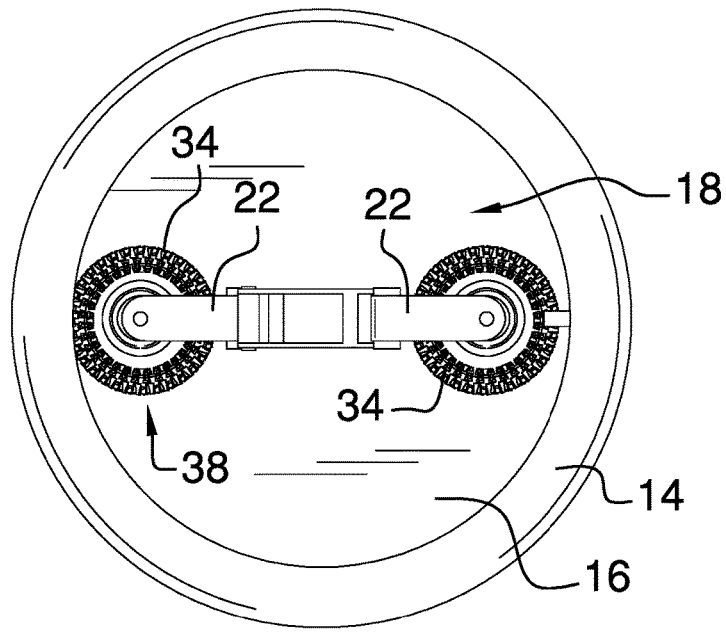
FIG. 4 is a bottom view of an embodiment of the disclosure with arms in the storage position.
Figure 5:
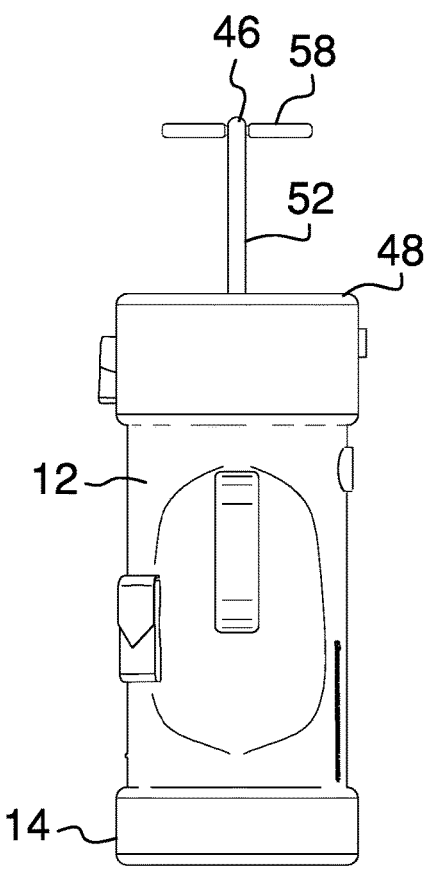
FIG. 5 is a front view of an embodiment of the disclosure.
Figure 6:
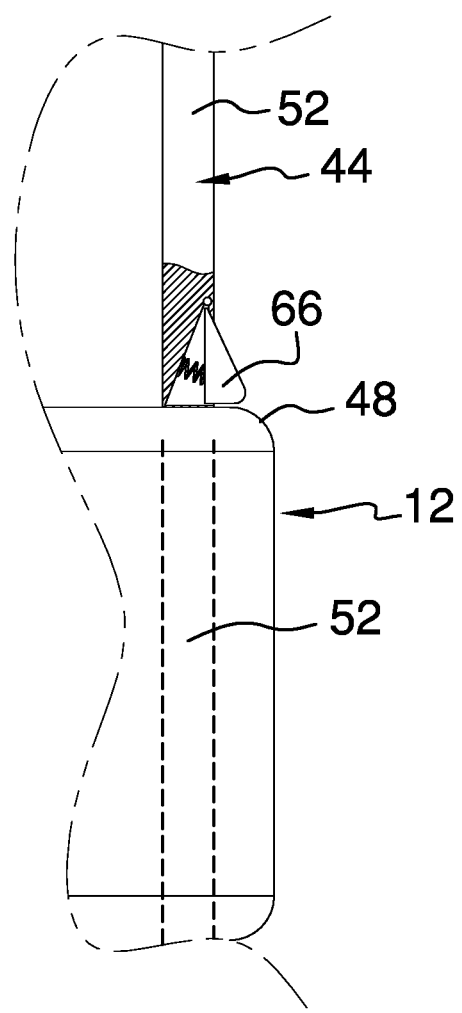
FIG. 6 is a partial side view of a top section of the golf bag of an embodiment of the disclosure.

With reference now to the drawings, and in particular to FIGS. 1 through 6 thereof, a new wheel device embodying the principles and concepts of an embodiment of the disclosure and generally designated by the reference numeral 10 will be described.

As best illustrated in FIGS. 1 through 6, the retractable golf bag wheel assembly 10 generally comprises a golf bag 12. A lip 14 is coupled to and extends downwardly from a bottom face 16 of the golf bag 12 defining a recess 18 into a bottom end 20 of the golf bag 12. Each of a pair of arms 22 has a proximal end 24 relative to the bottom face 16 of the golf bag 12. Each proximal end 24 is pivotally coupled to the golf bag 12 within the recess 18. Each of the arms 22 is adjustable between a storage position 26 within the recess 18 and an extended position 28 wherein distal ends 30 of the arms 22 relative to the bottom face 16 of the golf bag 12 extend outwardly from the recess 18. Each of the arms 22 has a medial pivot 32 wherein each of the arms 22 is collapsible to fit within the recess 18 when in the storage position 26. Each of a pair of wheels 34 is coupled to the distal end 32 of an associated one of the arms 22 relative to the bottom face 16 of the golf bag 12. Each of the wheels 34 is angled relative to the associated arm 22 to be oriented substantially parallel to the golf bag 12 when the arms 22 are in the extended position 28. Alternatively, the wheels 34 may be pivotally coupled to the distal end 32 of the associated one of the arms 22 in a conventional manner such that each of the wheels 34 is pivotable between a use position 36 wherein the wheels 34 are configured for rolling the golf bag 12 on a ground surface and a compacted position 38 wherein the wheels 34 are positioned for positioning in the recess 18 while the arms 22 are in the storage position 26.

A catch 40 extends from the lip 14 and engages the arms 22 when the arms 22 are in the storage position 26 wherein the catch 40 retains the arms 22 within the recess 18. The catch 40 may be a protrusion extending into or adjacent to the recess 18 at a bottom edge 42 of the lip 14. The catch 40 may engage the arms 22 by providing a physical obstruction to movement of the arms 22 out of the recess 18 or may conventionally couple to one of the arms 22 in a conventional manner.

A catch release 44 has a first end 46 positioned proximate to a top 48 of the golf bag 12. The catch release 44 has a second end 50 operationally coupled to the catch 40 such that manipulation of the first end 46 of the catch release 44 disengages the catch 40 from the arms 22 wherein the arms 22 are extendable into the extended position 28. The catch release 44 includes a rod 52 extendable from the 48 top of the golf bag 12.

Each of a pair of collars 54 is slidably positioned on an associated one of the arms 22. Each of a pair of stops 56 is positioned on an associated one of the arms 22 proximate to the medial pivot 32. Each stop 56 supports an associated one of the collars 54 in a position on the associated one of the arms 22 such that the associated collar 54 inhibits movement of the associated medial pivot 32. Thus, the arms 22 are prevented from being collapsed into the recess 18 and remain in the extended position 28 until each collar 54 is moved away from the medial pivot 32 of the associated one of the arms 22.

A handle 58 is coupled to the first end 46 of the catch release 44 such that the handle 58 is positioned adjacent to the top 48 of the golf bag 12 wherein the rod 52 defines a telescoping or extendable neck 60 for the handle 58. Actuation of the catch release 44 may be achieved by extension of the rod 52 from the top 48 of the golf bag 12 wherein the catch release 44 is mechanically retracted or pivoted in a conventional manner into a position away from the recess 18 allowing the arms 22 to move into the extended position 28 from the storage position 26. A biased handle catch 66 is provided to extend over the top 48 of the golf bag to prevent the rod 52 from being pushed back into the golf bag 12 until it is desired to do so. A stand 62 of conventional design has an upper end 64 pivotally coupled to the golf bag 12. The stand 62 has a pair of spaced lower ends 68 such that the stand 62 is configured for propping the golf bag 12 in a partially upright position on a ground surface.

In use, the golf bag is used in a conventional manner for carrying golf clubs and associated accessories while golfing. When desired, the handle 58 may be grasped to extend the rod 52 and actuate the catch release 44. The arms 22 are free to pivot into the extended position 28 where the collars 54 will gravitationally move into place to hold the arms 22 in the extended position 28. The wheels 34 are pivoted into the use position 36 and the golf bag 12 may then be transported by grasping the handle 58 and pulling the golf bag 12 to roll on the wheels 34. When desired, the wheels 34 are pivoted back into the compacted position 38 and each arm 22 is collapsed after moving the collar 54 away from the medial pivot 32 of each arm 22. When collapsed into the recess 18, the handle 58 is urged back towards the top 48 of the golf bag 12 to re-engage the catch release 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retractable golf bag wheel assembly comprising:
a golf bag;
a lip coupled to and extending downwardly from a bottom face of said golf bag defining a recess into a bottom end of said golf bag;
a pair of arms, each of said arms having a proximal end relative to said bottom face of said golf bag, each said proximal end being pivotally coupled to said golf bag within said recess, each of said arms being adjustable between a storage position within said recess and an extended position wherein distal ends of said arms relative to said bottom face of said golf bag extend outwardly from said recess, each of said arms having a medial pivot wherein each of said arms is collapsible to fit within said recess when in said storage position;
a pair of wheels, each of said wheels being coupled to said distal end of an associated one of said arms relative to said bottom face of said golf bag;
a catch extending from said lip and engaging said arms when said arms are in said storage position wherein said catch retains said arms within said recess;
a catch release having a first end positioned proximate to a top of said golf bag, said catch release having a second end operationally coupled to said catch such that manipulation of said first end of said catch release disengages said catch from said arms wherein said arms extend into said extended position;
a pair of collars, each collar being slidably positioned on an associated one of said arms; and
a pair of stops, each stop being positioned on an associated one of said arms proximate to said medial pivot, each stop supporting an associated one of said collars in a position on said associated one of said arms such that said associated collar inhibits movement of said associated medial pivot.

2. The device of claim 1, further comprising each of said wheels being pivotally coupled to said distal end of said associated one of said arms wherein each of said wheels is pivotable between a use position wherein said wheels are configured for rolling said golf bag on a ground surface and a compacted position wherein said wheels are positioned for positioning in said recess while said arms are in said storage position.

3. The device of claim 1, further comprising a handle coupled to said first end of said catch release such that said handle is positioned adjacent to said top of said golf bag.

4. The device of claim 3, further comprising said catch release including a rod extendable from said top of said golf bag wherein said rod defines a telescoping neck for said handle.

5. The device of claim 1, further comprising a stand having an upper end pivotally coupled to said golf bag, said stand having a pair of spaced lower ends such that said stand is configured for propping said golf bag in a partially upright position on a ground surface.

6. A retractable golf bag wheel assembly comprising:
a golf bag;
a lip coupled to and extending downwardly from a bottom face of said golf bag defining a recess into a bottom end of said golf bag;
a pair of arms, each of said arms having a proximal end relative to said bottom face of said golf bag, each said proximal end being pivotally coupled to said golf bag within said recess, each of said arms being adjustable between a storage position within said recess and an extended position wherein distal ends of said arms relative to said bottom face of said golf bag extend outwardly from said recess, each of said arms having a medial pivot wherein each of said arms is collapsible to fit within said recess when in said storage position;
a pair of wheels, each of said wheels being coupled to said distal end of an associated one of said arms relative to said bottom face of said golf bag, each of said wheels being pivotally coupled to said distal end of said associated one of said arms wherein each of said wheels is pivotable between a use position wherein said wheels are configured for rolling said golf bag on a ground surface and a compacted position wherein said wheels are positioned for positioning in said recess while said arms are in said storage position;
a catch extending from said lip and engaging said arms when said arms are in said storage position wherein said catch retains said arms within said recess; and
a catch release having a first end positioned proximate to a top of said golf bag, said catch release having a second end operationally coupled to said catch such that manipulation of said first end of said catch release disengages said catch from said arms wherein said arms are extendable into said extended position, said catch release including a rod extendable from said top of said golf bag;

a pair of collars, each collar being slidably positioned on an associated one of said arms;

a pair of stops, each stop being positioned on an associated one of said arms proximate to said medial pivot, each stop supporting an associated one of said collars in a position on said associated one of said arms such that said associated collar inhibits movement of said associated medial pivot;

a handle coupled to said first end of said catch release such that said handle is positioned adjacent to said top of said golf bag wherein said rod defines a telescoping neck for said handle; and a stand having an upper end pivotally coupled to said golf bag, said stand having a pair of spaced lower ends such that said stand is configured for propping said golf bag in a partially upright position on a ground surface.

* * * * *